UNITED STATES PATENT OFFICE.

J. G. KILGOUR, OF BROOKLYN, NEW YORK.

IMPROVED CEMENT FOR STEAM-JOINTS.

Specification forming part of Letters Patent No. 51,060, dated November 21, 1865.

*To all whom it may concern:*

Be it known that I, J. G. KILGOUR, of Brooklyn, in the county of Kings and State of New York, have invented a new and Improved Cement for Steam-Joints and Soft Patching; and I do hereby declare that the following is a full, clear, and exact description thereof, which will enable others skilled in the art to fully understand and make use of the same.

This invention relates to a cement which is intended particularly for steam-joints of any kind, and for the purpose of facilitating the application of patches to defective steam-boilers. It is composed of litharge, sugar of lead, venetian-red, whitening, and yellow ochre, a portion of which may, however, be replaced by fine sand. The proportion in which these ingredients are mixed together is about as follows: litharge, forty-five pounds; sugar of lead, two and one-half pounds; venetian-red, two and one-half pounds; whitening, twenty-two pounds; yellow ochre, twenty-eight pounds; or, if desired, the venetian-red may be omitted, and for a portion of the ochre (say about two pounds) a little quantity of fine sand may be substituted.

The above-named ingredients are reduced to a fine powder and intimately mixed, and the cement is sold in the form of powder. When it is to be used it is mixed with the boiled linseed-oil to the consistency of a stiff putty and applied to the joints or patches the same as red or white lead. It sets in a very short time, and makes a durable and strong joint.

What I claim as new, and desire to secure to secure by Letters Patent, is—

1. A cement composed of litharge, sugar of lead, whitening, and yellow ochre, mixed together in suitable proportions, substantially as and for the purpose set forth.

2. A cement composed of litharge, sugar of lead, whitening, and yellow ochre, mixed with venetian-red in suitable proportions, as described.

J. G. KILGOUR.

Witnesses:
M. M. LIVINGSTON,
W. HAUFF.